Feb. 28, 1939. T. M. HARVEY ET AL 2,149,019
MEANS FOR DISPLAYING OBJECTS, SPECIALLY APPLICABLE TO SHOP WINDOWS
Filed Oct. 28, 1937 2 Sheets-Sheet 1
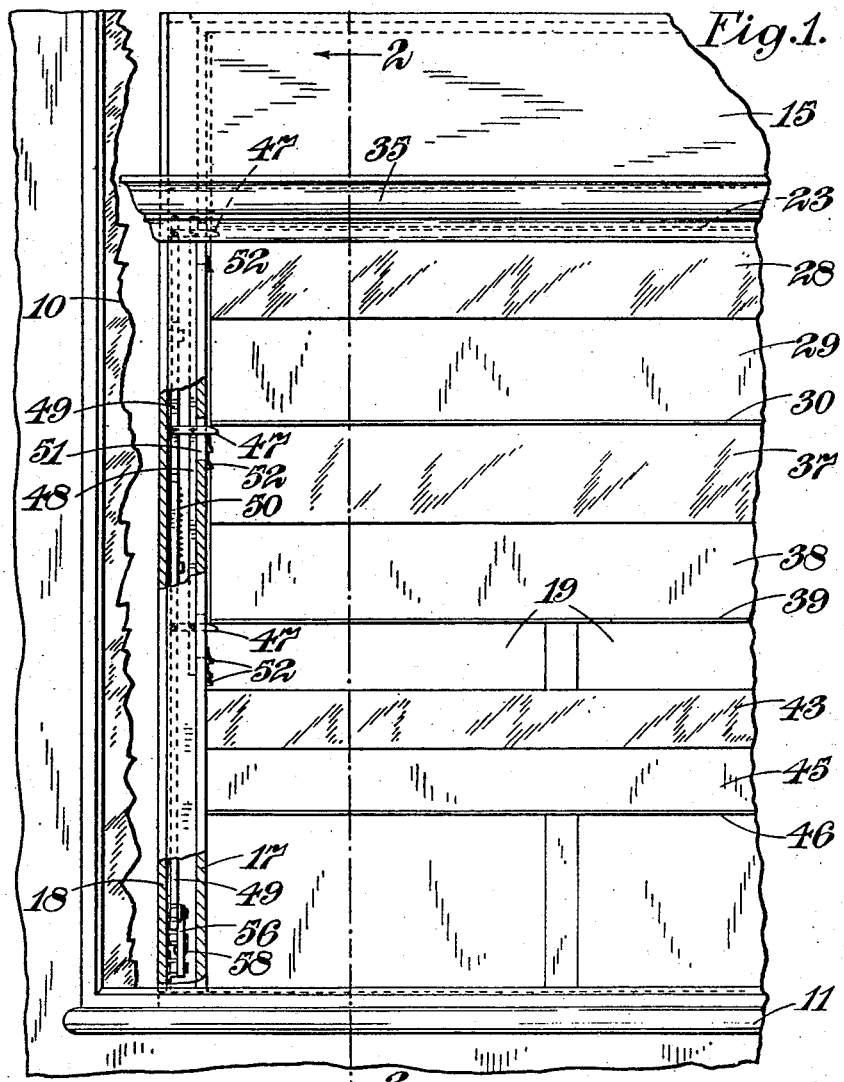
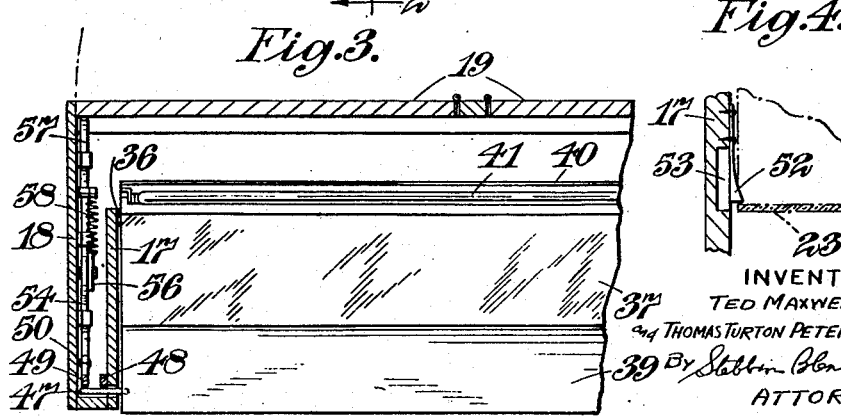
INVENTORS
TED MAXWELL HARVEY
and THOMAS TURTON PETERSON SHERWOOD
BY
ATTORNEYS

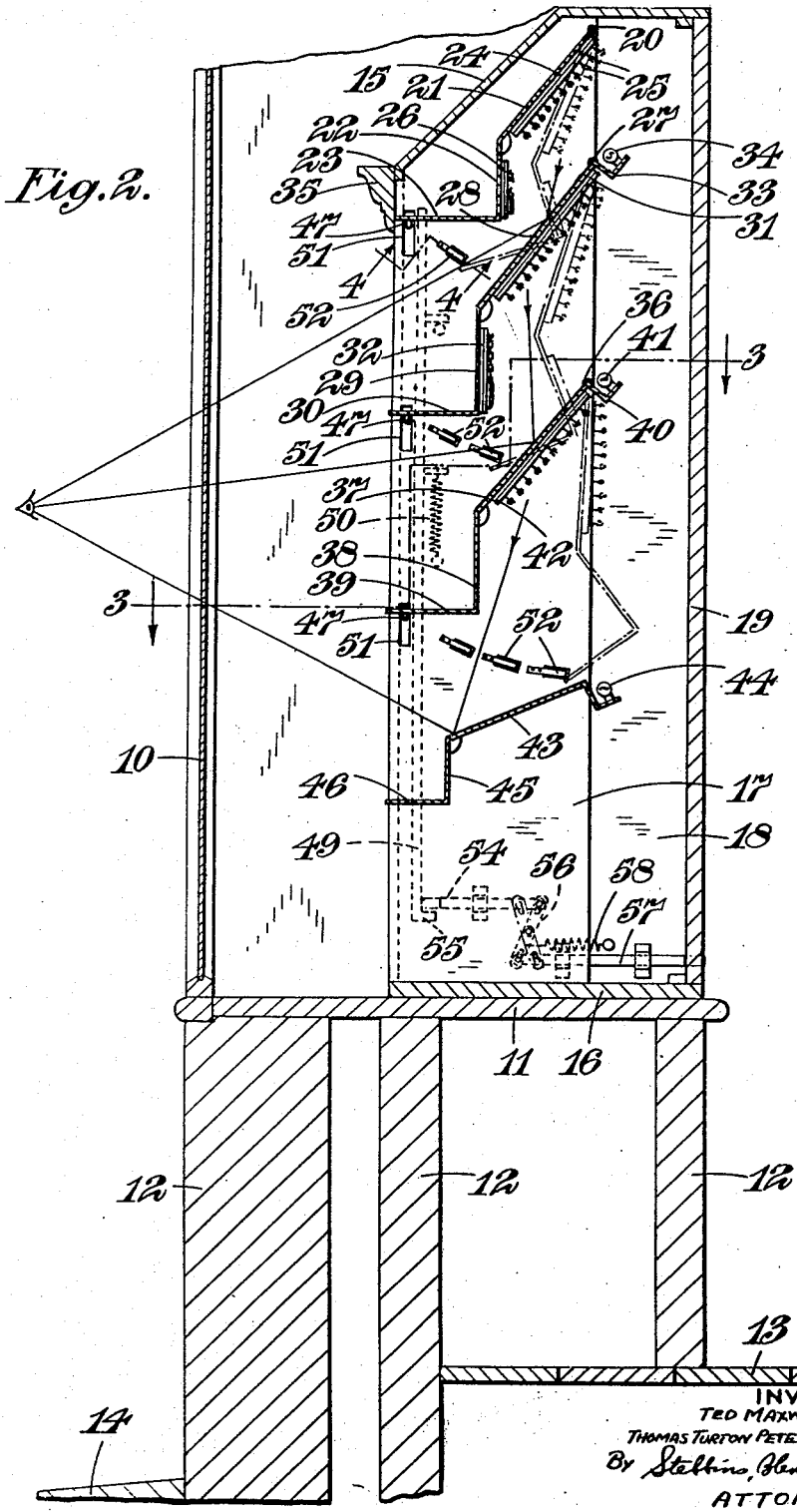

Patented Feb. 28, 1939

2,149,019

UNITED STATES PATENT OFFICE 2,149,019

MEANS FOR DISPLAYING OBJECTS, SPECIALLY APPLICABLE TO SHOP WINDOWS

Ted Maxwell Harvey, London, and Thomas Turton Peterson Sherwood, Wakefield, England Application October 28, 1937, Serial No. 171,434
In Great Britain August 25, 1936

7 Claims. (Cl. 312—136)

This application was filed in Great Britain on August 25, 1936.

This invention is for improved means for displaying objects, specially applicable to shop windows, and has for one of its objects to ensure the safety of the articles displayed while permitting them to be readily inspected. The invention may be employed to protect valuable articles, such as jewellery, against thieves, or it may be employed to protect delicate articles from exposure to sunlight, or for other purposes.

A specific object of the invention is to provide in an improved form, a display means which comprises a reflector disposed opposite to a support for the articles to be displayed and also opposite to a viewing aperture whereof opposite sides are constituted by the edges of opaque non-reflecting extensions from the reflector and support, which reflector, support and extensions are so proportioned and arranged as to obstruct the articles on the support from direct view through the viewing aperture while leaving the reflector visible and free to reflect the articles on the support through the said aperture. Thus although the articles on the support cannot be directly viewed, reflections of them can be inspected through the aperture and with a suitable form of reflector it will not be apparent to an observer that he is not in fact looking directly at the articles. Direct unauthorized access to the articles is thereby made difficult, or impossible, and direct access of sunlight to the articles is prevented.

It is preferred not to employ an ordinary glass mirror as the reflector because owing to the fact that the light has to pass through the thickness of the glass twice in reaching and leaving the reflecting surface the image seen by the observer is apt to be blurred or duplicated or triplicated. Rather, it is preferred to arrange that the reflecting surface of the reflector is that surface which is directed towards the support and the viewing aperture so that the light does not pass through the body of the reflector. For instance, the reflector may be made of glass, metal, porcelain or the like with a silvered surface directed towards the support and towards the viewing aperture. In such a reflector a sharp image of the articles is readily obtainable.

According to a further feature of the invention the support for the articles is hinged and tends to swing out of operative position and is adapted to be held in operative position by a light catch which is readily dislodged by light pressure or shock. It is also a feature of the invention to arrange that the support is hinged at its upper rear edge so that when the said catch is dislodged the lower edge of the support will swing downwardly and rearwardly out of operative position. When the catch is so dislodged the support will swing into a position in which its face carrying the articles is inaccessible from the viewing side and it may remain automatically held in that position, say by another catch over which it has swept. Thus, for instance, if a main window protecting the articles is smashed, the shock will release the aforesaid light catch and permit the support to swing into a position completely inaccessible from the window side.

If desired the display means may comprise a plurality of reflectors and supports arranged in a vertical tier, which reflectors and supports are combined in such a way that one face of an entity serves as a support and the opposite face serves as a reflector.

For a more complete understanding of these and other features of the invention there will now be described by way of example only and with reference to the accompanying drawings one constructional form of display means according to the invention. It is to be understood, however, that the invention is not restricted to the precise constructional details set forth.

In these drawings—

Figure 1 is a front view of a part of a display means according to the invention, portions being broken away to expose parts which would otherwise be hidden;

Figure 2 is a vertical section on the line 2—2 of Figure 1;

Figure 3 is a horizontal section on the line 3—3 of Figure 2, and

Figure 4 is an enlarged sectional view on the line 4—4 of Figure 2.

Like reference numerals indicate like parts throughout the drawings.

In Figures 1 and 2 a shop window is shown at 10 which has suitable framing 11 and main supports 12. The floor inside the shop is shown at 13 and the pavement outside at 14. The display means according to the invention are mounted on the framing 11 behind the window 10. These display means comprise a case which consists of a top 15, base 16, double end walls 17 and 18 and rear doors 19 which latter afford access to the interior from the inside of the shop by an operator or shop assistant.

Near the top of the display case there is pivoted at 20 in the inner wall 17 a support for articles to be displayed. This support is shown in full lines in Figure 2 in its operative position and in this position it comprises an oblique portion 21 which is the main support for the articles to be displayed, a vertical portion 22 which constitutes an extension of the oblique portion 21 and which also constitutes an additional support for the articles to be displayed, and a horizontal portion 23 which reaches forwardly from the lower edge of the vertical portion 22. To the under face of the oblique portion 21 there is secured a pad 24 for the reception of jewellery 25 or other articles to be displayed and to the rear face of the vertical portion 22 there is secured a pad 26 which is also intended for the reception of articles to be displayed.

Immediately below the member 21, 22, 23 there is pivoted at 27 in the inner end wall 17 a member which is of somewhat similar conformation to that of the member 21, 22, 23. It comprises an oblique portion 28 which is parallel or approximately parallel to the member 21, a vertical portion 29 and a horizontal portion 30. That face of the portion 28 which faces the pad 24 is a reflecting surface of the character described above while on the opposite face of the portion 28 there is affixed a pad 31 for the reception of articles to be displayed. Similarly on the rear face of the portion 29 there is affixed a pad 32 for the reception of articles to be displayed. The upper surface of the portion 30 constitutes a shelf which is directly visible from outside the window 10 and which may be used for the reception of articles say of a cheap kind. Behind the pivot 27 the member 28, 29, 30 carries a trough 33 in which is carried a lighting tube 34. The viewing aperture for the articles on the pads 24 and 26 and on the shelf 30 is determined as to its lower extremity by the forward edge of the portion 30 and as to its upper extremity by the forward edge of the portion 23 or, as illustrated, by the lower edge of a piece of moulding 35 which extends slightly lower than the said portion 23. Through this viewing aperture it will be impossible to see directly articles on the pads 24 and 26 but they will be seen in the reflecting surface of the member 28. The parts 22, 23, 29 and 30 are opaque and non-reflecting and they may if desired be covered with velvet or the like. It will be seen that the members 22 and 23 reach into the space between the members 21 and 28 thereby restricting the extent of direct vision through the viewing aperture and rendering it impossible for articles on the pads 24 and 26 to be directly seen.

Immediately below the member 28, 29, 30 there is pivoted at 36 in the inner end wall 17 a similar member 37, 38, 39 which has a trough 40 carrying a lighting tube 41. The upper face of the portion 37 is a reflecting surface and on the lower face there is carried a pad 42 for articles to be displayed. There is no such pad at the back of the portion 38. For the purpose of viewing articles on the pads 31 and 32 the viewing aperture is constituted by the forward edges of the members 30 and 39 and it will be seen that articles on those pads cannot be directly viewed but can only be seen in the reflecting surface of the member 37.

Below the member 37, 38, 39 there is a fixed reflector 43 having a lighting tube at 44, a downward vertical extension 45 at its forward end and a horizontal shelf 46, the members 45 and 46 being opaque and nonreflecting. For the purpose of viewing articles on the pad 42 the viewing aperture is determined by the forward edges of the members 45 and 46.

The hinged members are shown in Figure 2 in full lines in their operative positions and in chain lines in their inoperative positions, the pivoting or hinging being such that the hinged members tend to move into their inoperative positions. They are held in their operative positions by light catches which may take any suitable form such as spring pressed balls but which as illustrated take the form of levers 47 which, as will be seen from Figure 1, are pivoted on a strip 48 mounted in the space between the walls 17 and 18 and fixed to the former. The catches 47 are also pivoted to a movable rod 49 which is located in the space between the end walls 17 and 18 and is urged downwardly by a light spring 50. The rod 49 is arranged to slide vertically in guides carried by the wall 18 and the catches 47 reach through apertures 51 in the end wall 17 to lie immediately below the members 23, 30, 39. The strength of the spring 50 is just sufficient to maintain the said members supported in their operative positions but if even light pressure or shock reaches the said hinged members the pull of the spring 50 will be overcome and the hinged members will fall back into the positions shown in chain lines in Figure 2 in which positions it will be seen that the articles carried on the pads 24, 26, 31, 32 and 42 will be inaccessible from the window side of the display means. The rod 49 is held up against the tension spring 50 in the position by the weight of and on the hinged members 47. Figure 1 shows the hinged members bearing downwardly upon one end of each pivoted lever 47, which will cause the other end thereof to hold up the rod 49 to which one end of the lever 47 is attached. To set the hinged members initially in the full lines shown in Figure 2 or to reset them in that position after they have fallen back into the position shown in chain lines in Figure 2, the rod 49 is moved upwards manually against the tension of the spring 50 so as to bring the levers 47 into the position shown in Figure 1, after which the hinged members are gently lowered into position resting on the levers 47 and this will cause the rod 49 to be held in the position shown in Figure 1.

When the hinged members swing rearwardly into their chain line positions they will sweep past other catches which act to prevent return of the hinged members towards operative position. These catches which hold the hinged members in inoperative position may be such as can only be unlocked by a key, but as illustrated they take the form of spring members 52 which are secured to the end wall 17 and which overlie recesses 53 in the latter. Thus when a hinged member is swinging from operative to inoperative position it will push the catch 52 into the recess 53 and will pass beyond the catch which latter will then return to its previous position and prevent return swing of the hinged member. To permit resetting of the hinged members in the position shown in full lines in Figure 2, the catches 52 are manually pressed back into their recesses 53 so that the hinged members may be swung past the catches and to the full line positions shown in Figure 2.

In order to permit a shop assistant or other operator to affix articles to the display pads or remove them without disturbing the setting of the whole display means a locking device controlling the catches 47 is provided. This comprises a bolt 54 which is mounted to slide on the end wall 18 in such manner that its end can reach above an abutment 55 at the lower end of the rod 49 and prevent upward movement thereof. The bolt 54 is connected by a link 56 to a rod 57 which is also arranged to slide in supports carried by the wall 18 and a spring 58 urges the rod 57 rearwardly. The rear end of the rod 57 reaches into position to be engaged by the door 19 when the latter is closed. Therefore when the door is opened the spring 58 in urging the rod 57 rearwardly will also move the bolt 54 into locking position above the abutment 55 and thus prevent the catchs 47 from being dislodged and releasing the hinged members. Immediately the door 19 is closed again the bolt 54 is withdrawn into inoperative position and the catches 47 are no longer held locked against being dislodged from below the hinged members.

It will be appreciated that each reflector and support has opaque, non-reflecting extensions which constitute opposite sides of the viewing apertures and are arranged to obstruct the articles being displayed from direct view through the viewing apertures while leaving the reflectors visible and free to reflect the articles through the said apertures. Instead of the particular formation of these extensions as shown in the drawings, the extensions in the cases of the reflectors may be merely a plane continuation of the reflector but should be oqapue and non-reflecting and should extend sufficiently far back from the viewing aperture as to ensure that an observer will not be able to see any reflection of any article not located inside the show case. That is to say the extension should commence at a point sufficiently far back to be intersected by a line reaching it perpendicularly from the upper edge of the viewing aperture. In the case of the extension from the support for the articles to be displayed, if the horizontal shelves shown in the drawings are not required for displaying articles they may be hidden behind plane extensions of the supports. In all cases parts of the device not required to reflect may be covered with velvet or the like.

From the foregoing it will be seen that the construction according to the present invention offers complete security for valuable articles while permitting them to be displayed to possible purchasers. It is to be understood that the invention is not restricted to the precise constructional details set forth. For instance, angles other than those shown in the drawings may be chosen for the reflectors and supports and they could also be vertical.

We claim:

1. Means for displaying objects, specially applicable to shop windows, comprising a support for the articles to be displayed, a hinging mounting for said support affording a bias whereby the support tends to swing out of operative position, a light catch adapted to hold the support in operative position but to be readily dislodged by light pressure or shock, a reflector disposed opposite to said support, and opaque non-reflecting extensions from the reflector and support, which extensions constitute opposite sides of a viewing aperture opposite to the reflector, and which reflector, support and extensions are so proportioned and arranged as to obstruct the articles on the support from direct view through the viewing aperture while leaving the reflector visible and free to reflect the articles on the support through the said aperture.

2. Means for displaying objects, specially applicable to shop windows, comprising a support for the articles to be displayed, a hinge for said support located at its upper rear edge so that the lower edge of the support tends to swing downwardly and rearwardly out of operative position, a light catch adapted to hold the support in operative position but to be readily dislodged by light pressure or shock, a reflector disposed opposite to said support, and opaque non-reflecting extensions from the reflector and support, which extensions constitute opposite sides of a viewing aperture opposite to the reflector, and which reflector, support and extensions are so proportioned and arranged as to obstruct the articles on the support from direct view through the viewing aperture while leaving the reflector visible and free to reflect the articles on the support through the said aperture.

3. Means for displaying objects, specially applicable to shop windows, comprising a support for the articles to be displayed, a hinge for said support located at its upper rear edge so that the lower edge of the support tends to swing downwardly and rearwardly out of operative position, a light catch adapted to hold the support in operative position but to be readily dislodged by light pressure or shock, a second catch past which the support will swing in moving out of operative position, which second catch acts to prevent return of the support towards operative position, a reflector disposed opposite to said support, and opaque non-reflecting extensions from the reflector and support, which extensions constitute opposite sides of a viewing aperture opposite to the reflector, and which reflector, support and extensions are so proportioned and arranged as to obstruct the articles on the support from direct view through the viewing aperture while leaving the reflector visible and free to reflect the articles on the support through the said aperture.

4. Means for displaying objects, specially applicable to shop windows, comprising a plurality of composite entities arranged in a vertical tier, each composite entity having one face adapted to serve as a support for the articles to be displayed and having the opposite face adapted to serve as a reflector and also having opaque non-reflecting extensions from the reflectors and supports, which extensions constitute opposite sides of viewing apertures, the composite entities being so arranged in the tier that each reflector is disposed opposite to a viewing aperture and opposite to a support in the next adjacent composite entity, and which reflectors, supports and extensions are so proportioned and arranged as to obstruct the articles on the supports from direct view through the viewing apertures while leaving the reflectors visible and free to reflect the articles on the supports through the said apertures.

5. Means for displaying objects, specially applicable to shop windows, comprising a support for the articles to be displayed, a reflector disposed opposite to said support, and opaque non-reflecting extensions from the reflector and support, which extensions constitute opposite sides of a viewing aperture opposite to the reflector and the extension from the reflector taking the form of a shelf which extends horizontally and rearwardly from the lower edge of the viewing aperture so as to be directly visible through the latter and a vertical wall which reaches to the forward edge of the reflector, and which reflector, support and extensions are so proportioned and arranged as to obstruct the articles on the support from direct view through the viewing aperture while leaving the reflector visible and free to reflect the articles on the support through the said aperture.

6. Means for displaying objects, specially applicable to shop windows, comprising a support for the articles to be displayed, a reflector disposed opposite to said support, and opaque non-reflecting extensions from the reflector and support, which extensions constitute opposite sides of a viewing aperture opposite to the reflector and the extension from the reflector taking the form of a shelf which extends horizontally and rearwardly from the lower edge of the viewing aperture so as to be directly visible through the latter and a vertical wall which reaches to the forward edge of the reflector and the rearwardly directed surface of which vertical wall is adapted to act as an additional support for the articles to be displayed, said surface being so situated as to be visible as reflected by the reflector but not directly visible through the viewing aperture, and which reflector, support and extensions are so proportioned and arranged as to obstruct the articles on the support from direct view through the viewing aperture while leaving the reflector visible and free to reflect the articles on the support through the said aperture.

7. Means for displaying objects, specially applicable to shop windows, comprising a support for the articles to be displayed, a hinging mounting for said support affording a bias whereby the support tends to swing out of operative position, a light catch adapted to hold the support in operative position but to be readily dislodged by light pressure or shock, a reflector disposed opposite to said support, opaque non-reflecting extensions from the reflector and support, which extensions constitute opposite sides of a viewing aperture opposite to the reflector, and which reflector, support and extensions are so proportioned and arranged as to obstruct the articles on the support from direct view through the viewing aperture while leaving the reflector visible and free to reflect the articles on the support through the said aperture, an enclosure for all of the foregoing parts comprising an operator's door giving access to the interior, a locking device adapted to hold the aforesaid catch positively against being dislodged into release position, and means whereby said locking device is itself controlled by the operator's door in such manner that the locking device is rendered inoperative when the door is closed.

TED MAXWELL HARVEY.
THOMAS TURTON PETERSON SHERWOOD.